(12) United States Patent
Chen et al.

(10) Patent No.: US 11,615,494 B2
(45) Date of Patent: Mar. 28, 2023

(54) INTELLECTUAL PROPERTY RECOMMENDING METHOD AND SYSTEM

(71) Applicant: Taiwan Semiconductor Manufacturing Co., Ltd., Hsinchu (TW)

(72) Inventors: Ker-Min Chen, Hsinchu (TW); Hsiao-Han Hu, Hsinchu (TW); Tai-Chuan Chen, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 366 days.

(21) Appl. No.: 16/901,006

(22) Filed: Jun. 15, 2020

(65) Prior Publication Data
US 2021/0390644 A1   Dec. 16, 2021

(51) Int. Cl.
| | | |
|---|---|---|
| G06Q 50/18 | (2012.01) | |
| G06N 5/04 | (2023.01) | |
| G06F 16/9038 | (2019.01) | |
| G06Q 30/0204 | (2023.01) | |
| G06Q 20/12 | (2012.01) | |
| G06N 20/00 | (2019.01) | |

(52) U.S. Cl.
CPC ....... *G06Q 50/184* (2013.01); *G06F 16/9038* (2019.01); *G06N 5/04* (2013.01); *G06N 20/00* (2019.01); *G06Q 20/1235* (2013.01); *G06Q 30/0204* (2013.01)

(58) Field of Classification Search
CPC .................................................. G06Q 50/184
See application file for complete search history.

(56) References Cited

U.S. PATENT DOCUMENTS

| | | | |
|---|---|---|---|
| 2003/0004936 A1* | 1/2003 | Grune | G06Q 10/10 |
| 2004/0122841 A1* | 6/2004 | Goodman | G06Q 50/18 |
| | | | 707/999.102 |
| 2014/0075004 A1* | 3/2014 | Van Dusen | H04L 41/04 |
| | | | 709/223 |
| 2014/0164008 A1* | 6/2014 | Gordon | G16H 20/10 |
| | | | 705/2 |
| 2014/0365386 A1* | 12/2014 | Carstens | G06Q 10/10 |
| | | | 705/310 |
| 2016/0148327 A1* | 5/2016 | Buchholz | G06Q 50/184 |
| | | | 705/310 |
| 2021/0004921 A1* | 1/2021 | Lee | G06Q 30/0627 |
| 2021/0011935 A1* | 1/2021 | Walsh | G06F 40/289 |
| 2021/0073456 A1* | 3/2021 | Nath | G06N 5/003 |

OTHER PUBLICATIONS

Nath, Siddhartha, New Applications of Learning-Based Modeling in Nanoscale Integrated-Circuit Design, ProQuest Dissertation Publishing, 2016 (Year: 2016).*

* cited by examiner

Primary Examiner — Matthew L Hamilton
(74) Attorney, Agent, or Firm — JCIPRNET

(57) ABSTRACT

An intellectual property (IP) recommending method and an IP recommending system are provided. In the method, a plurality of IP portfolios respectively designated for a plurality of product designs are retrieved and usage data of a plurality of IPs included in each of the plurality of IP portfolios are extracted. A machine learning (ML) model is trained by using a portion of the retrieved IP portfolios and the extracted usage data. In response to receiving at least one criterion for a desired product design from a user, a plurality of IPs adapted for the desired product design are predicted based on the ML model and recommended for the user.

20 Claims, 4 Drawing Sheets

INTELLECTUAL PROPERTY RECOMMENDING METHOD AND SYSTEM

BACKGROUND

Silicon Intellectual properties (IPs), are critical components for product design.

However, the selection of the IPs is quite time consuming since the feature of an IP is not easily captured from various format of the IP document and the confidence on the IPs is hard to derive, especially for new products (e.g. new tap-out in the semiconductor industry) on new technologies. With growing content of IP portfolios in advanced technologies, a product developer usually takes a long time to look for useful IPs for the desired product or design from numerous IP portfolios with limited technical support.

BRIEF DESCRIPTION OF THE DRAWINGS

Aspects of the present disclosure are best understood frog the following detailed description when read with the accompanying figures. It is noted that, accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
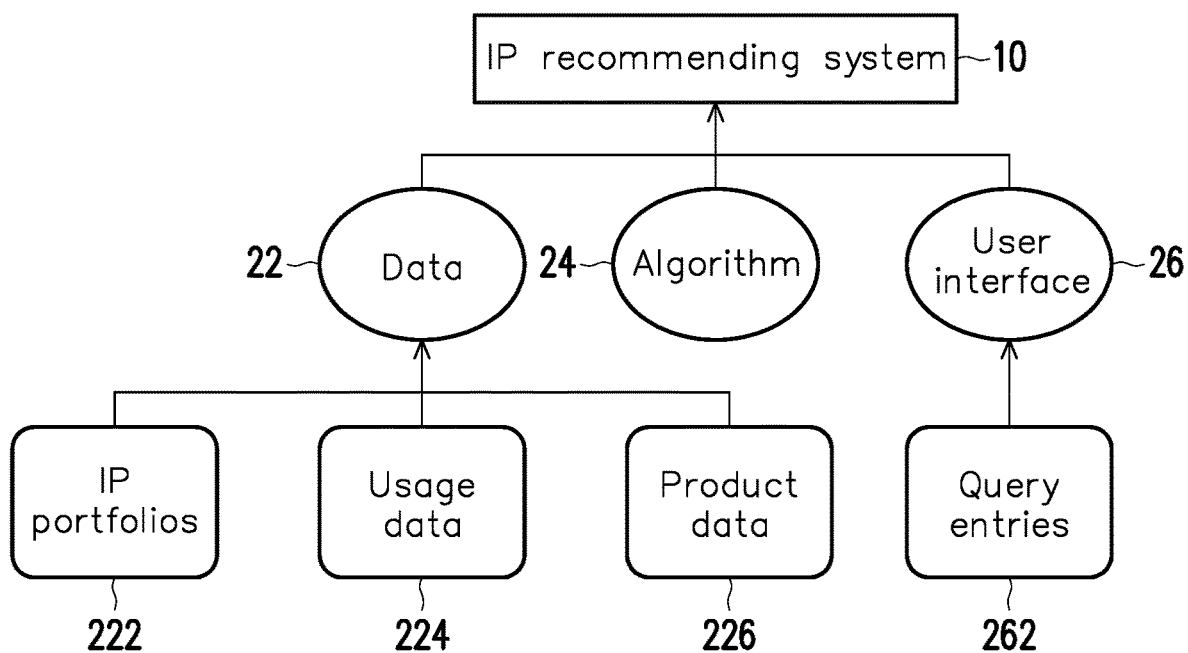
FIG. 1 illustrates a framework of an intellectual property (IP) recommending system according to an exemplary embodiment of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a framework of an intellectual property (IP) recommending system according to an exemplary embodiment of the disclosure. With reference to FIG. 1, an IP recommending system 10 is provided as or configured in a server, a workstation, a personal computer, a tabular computer or any other electronic apparatus having computing capability. The IP recommending system 10 is established by data 22, an algorithm 24, and a user interface 26.

The data 22 may include IP portfolios 222, usage data 224, and product data 226 obtained from various sources such as IP providers, commercial databases, enterprise resource planning (ERP) systems, or product data management (PDM) systems. The IP portfolios 222 may include feature information and specification information of each IP, in which the feature information may include a provider, a name, a type, or a version of the IP, and the specification information may include a dimension, a process, a protocol (e.g. telecommunication protocol), a performance, or a power consumption required for the IP. The usage data 224 may include information of IP in production and the products the IP is applied for. The product data 226 may include market segment information.

The algorithm 24 is provided to train a machine learning (ML) model for learning the relationships among the product market segment and IP usage. The algorithm 24 may be a rule-based algorithm, a segment-based algorithm, an item-based algorithm, or a segment and item based algorithm, but the disclosure is not limited thereto.

The user interface 26 is, for example, a graphical user interface (GUI) including various fields for the user to input search criteria. In some embodiments, the user interface 26 may provide pull-down menus such that the user may select one of the items from each pull-down menu as the query entries 262. In some embodiments, the user interface 26 may be configured as a search engine which provides a query field for the user to input keywords as the query entries 262 and displays a search result including the IPs that meet the requirements of the query entries 262.

Figure 2:
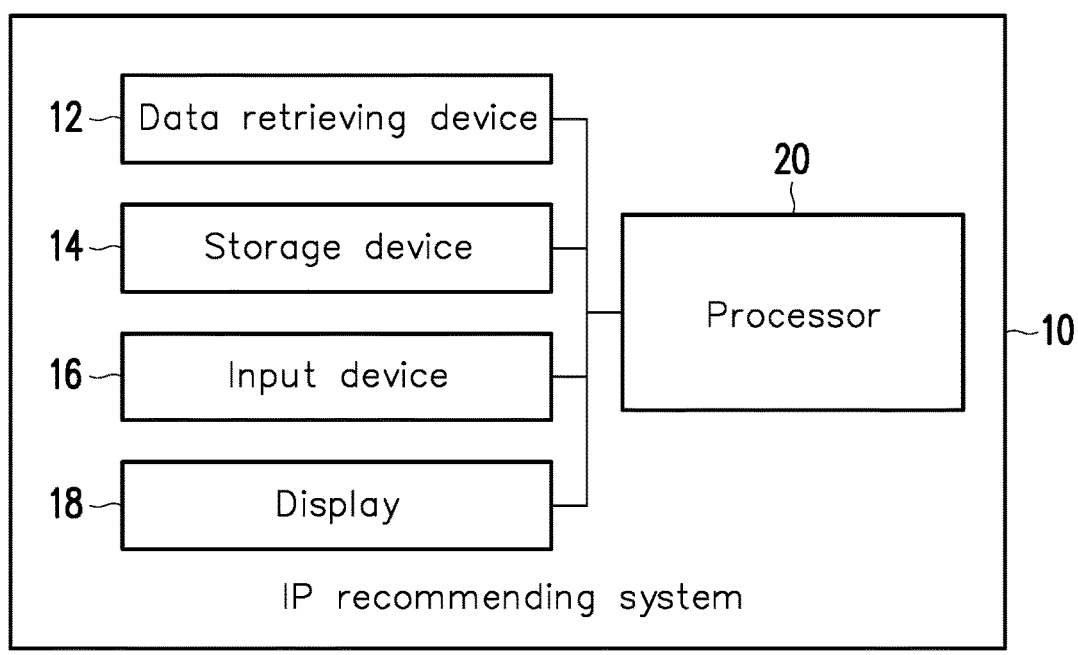
FIG. 2 illustrates a block diagram of an IP recommending system according to an exemplary embodiment of the disclosure.

FIG. 2 illustrates a block diagram of an IP recommending system according to an exemplary embodiment of the disclosure. With reference to FIG. 1, the IP recommending system 10 includes, for example, a data retrieving device 12, a storage device 14, an input device 16, a display 18 and a processor 20, and functions of those devices are described as follows.

The data retrieving device 12 is, for example, an interface device such as universal serial bus (USB), firewire or thunderbolt, a network card supporting wired network connection such as Ethernet, or a wireless network card supporting wireless communication standards such as Institute of Electrical and Electronics Engineers (IEEE) 802.11n/b/g. Accordingly, the data retrieving device 12 is configured to connect remote servers or computers so as to retrieve at least one IP database stored in those servers or computers.

The storage device 14 is, for example, any form of a fixed or movable random access memory (RAM), a read-only memory (ROM), a flash memory, any other similar device, or a combination of the foregoing devices. In one embodiment, the storage device 14 is configured to store data retrieved by the data retrieving device 12 and record computer instructions or programs which may be accessed and executed by the processor 20.

The input device 16 is, for example, a keyboard, a mouse, a touch panel, a touch screen, or any other input tool and is configured to receive an input of a user.

The display 18 is, for example, a liquid crystal display (LCD), a light-emitting diode (LED) display, a field emission display (FED), or another type of display device and configured to display images or frames output by the processor 20.

The processor 20 is, for example, a central processing unit (CPU), a programmable microprocessor for general or special use, a digital signal processor (DSP), a programmable controller, an application specific integrated circuit (ASIC), a programmable logic device (PLD), any other similar device, or a combination of the foregoing devices. The processor 20 is coupled to the data retrieving device 12, the storage device 14, the input device 16 and the display 18, and configured to load instructions from the storage device 14 to accordingly execute an IP recommending method provided by the embodiments of the disclosure. An embodiment is provided hereinafter to elaborate steps of this method in detail.

Figure 3:
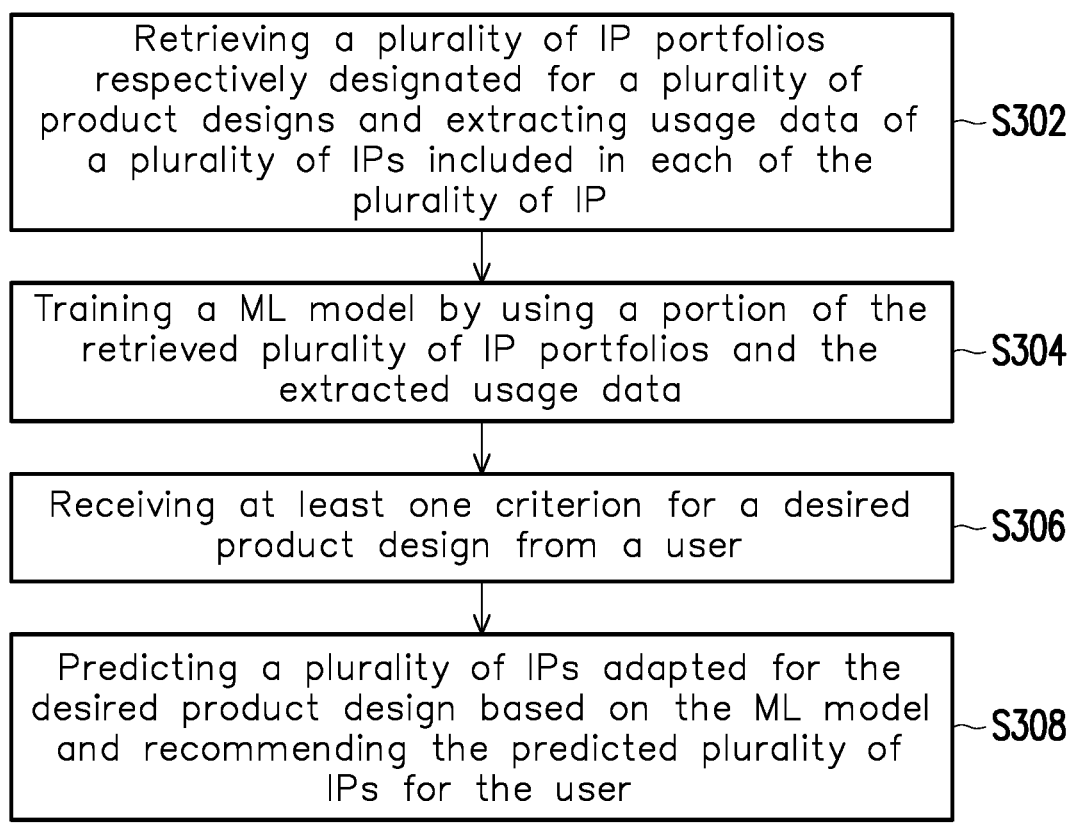
FIG. 3 illustrates a flowchart of an IP recommending method according to an exemplary embodiment of the disclosure.

FIG. 3 illustrates a flowchart of an IP recommending method according to an exemplary embodiment of the disclosure. With reference to FIG. 2 and FIG. 3 together, the method of this embodiment is adapted for the IP recommending system 10 of FIG. 2, and steps of the method are described in detail with reference to devices of the IP recommending system 10.

In step S302, the processor 20 retrieves a plurality of IP portfolios respectively designated for a plurality of product designs by using the data retrieving device 12 and extracts usage data of a plurality of IPs included in each of the plurality of IP portfolios. The product design is, for example, a tap-out in the semiconductor industry, but the disclosure is not limited thereto.

In some embodiments, the processor 20 may label each IP included in each IP portfolio with at least one criterion including one or a combination of a provider, a name, a type and a version of the IP, and a dimension, a process, a protocol, a performance, and a power consumption required for a product of the IP. In some embodiments, the usage data refers to historical IP usage data of the IP users, and the processor 20 may also label the usage data of each of the plurality of IPs with at least one IP user and at least one product the IP is applied for.

In step S304, the processor 20 trains a machine learning (ML) model by using a portion of the retrieved plurality of IP portfolios and the extracted usage data. In some embodiments, the processor 20 may store the parameters of the trained ML model in the storage device 14.

In some embodiments, the processor 20 may divide the retrieved data into training data and evaluation data, so as to use the training data to train the ML model and then uses the evaluation data to evaluate the performance of the trained ML model. For example, in case the processor 20 has retrieved data dated on past N years, the processor 20 may use the retrieved data dated on the former (N−1) years as the training data to train the ML model, and then uses the retrieved data dated on the last year to evaluate the performance of the trained ML model. In some embodiments, if the evaluation result is poor (e.g. below a predefined threshold or standard), the processor 20 may retrieve more training data or modify the algorithm to re-train the ML model.

In some embodiments, the ML model is a mathematical model constructed by techniques such as artificial neural network, decision tree, regression analysis, or matrix factorization (MF). In some embodiments, the mathematical model is built with a plurality of connected units called "neurons" which may process the input data or the data received from other neurons. The neurons are aggregated into layers including an input layer, at least one hidden layer, and an output layer, in which different layers may perform different transformations on their inputs. In some embodiments, each of the neurons may apply the inputs to a non-linear function to compute the output. In some embodiments, each of the neurons and each of the connections (i.e. so-called "edges") between the neurons have a weight and the weights of the neurons and the edges are adaptively adjusted to match the input data to the output data as learning proceeds.

In some embodiments, the items (e.g. parameters or criterions) specified in the retrieved IP portfolios and the usage data may used as elements to establish the ML model with an item-based algorithm or a segment-based algorithm. The item-based algorithm is based on similarity of item attributes, and utilizes a series of discrete, pre-tagged characteristics of items to recommend additional items with similar properties. The segment-based algorithm takes use of segmentation techniques such as thresholding, or K-means clustering. As for K-means clustering, the algorithm may identify groups in data of a user's past behavior (e.g. items previously selected) with a variable representing the number of groups, and assign each data point to one of the groups based on similarity. The clustering is iteratively executed to form groups so that the model can be used to predict items that the user may have an interest in.

Referring back to FIG. 3, in step S306, the processor 20 receives at least one criterion for a desired product design from the user by using the input device 16, and then in step S308, the processor 20 predicts a plurality of IPs adapted for the desired product design based on the ML model and recommends the predicted plurality of IPs for the user by displaying the predicted plurality of IPs on the display 18. In some embodiments, the processor 20 may display a user interface including at least one entry for receiving an input of the at least one criterion for the desired product design, and then display the predicted plurality of IPs recommended for the user on the user interface.

In some embodiments, the processor 20 may display the predicted IPs as a list including fields of one or a combination of a name of each IP, and a type of a product of each IP on the display 18 so as to recommend the IPs for the user. In some embodiments, the processor 20 may further sort the predicted IPs according to a usage probability of each IP and then display the sorted IPs accordingly.

Figure 4:
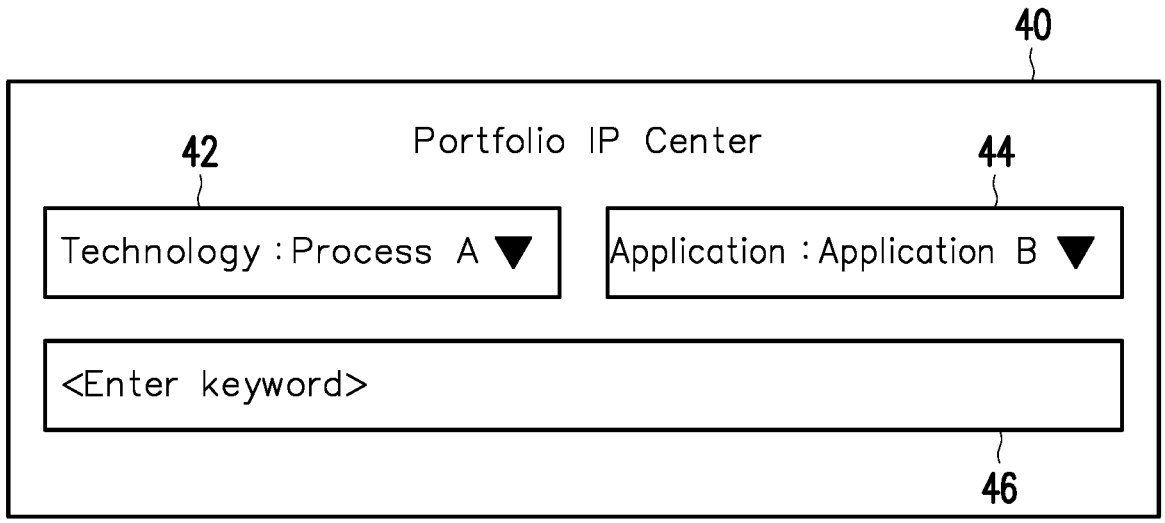
FIG. 4 illustrates an example of a user interface for recommending IPs according to an exemplary embodiment of the disclosure.
Figure 5:
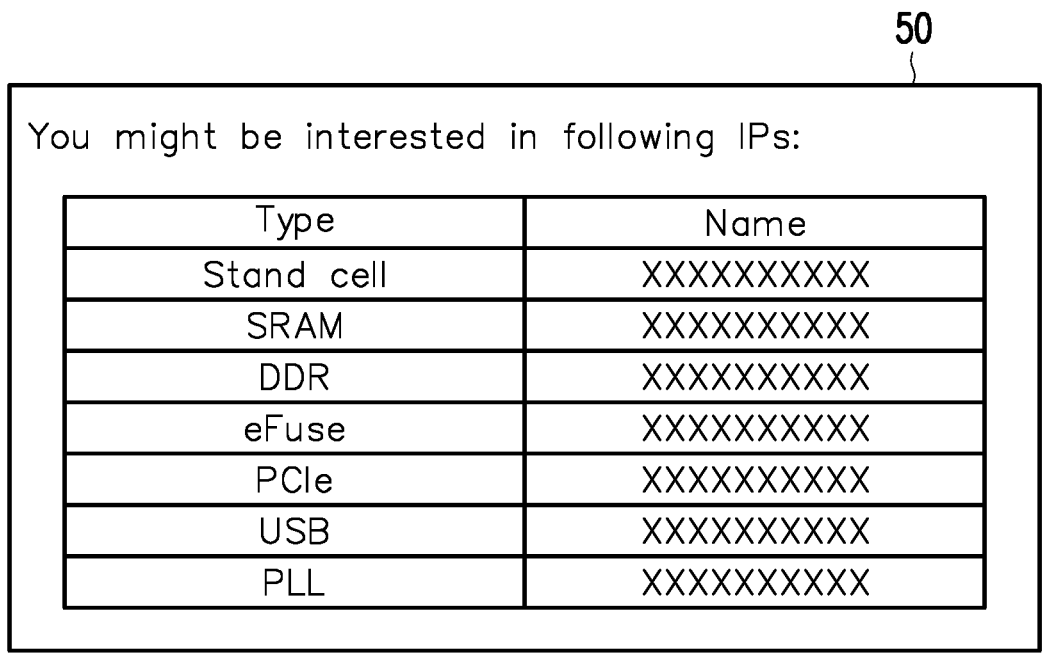
FIG. 5 illustrates an example of a user interface for recommending IPs according to an exemplary embodiment of the disclosure.

For example, FIG. 4 and FIG. 5 illustrate an example of a user interface for recommending IPs according to an exemplary embodiment of the disclosure. With reference to FIG. 4, a user interface 40 is given when a user activates the IP recommending system of the disclosure. The user interface 40 includes a field of technology 42, a field of application 44, and a field of keyword 46. The field of technology 42 and the field of application 44 are given in a form of pull-down menu and the user may click/tap on the inverted triangle mark on the right side to pull down selectable items and then select the item to be searched. In the present example, the user selects the "Process A" as the technology to be searched and selects the "Application B" as the application to be searched. In addition, the user may further enter at least one keyword in the field of keyword 46 as a search criterion. As a result, the selected items "Process A" and "Application B" and the entered keyword are used as inputs to the previously trained ML model so as to predict the IPs (i.e. the outputs of the ML model) adapted for the search criteria. The predicted IPs are displayed as a list 50 illustrated in FIG. 5 which includes a field of "Type" of a product of each IP and a field of "Name" of each IP.

Based on the IPs predicted by the ML model and recommended by the IP recommending system, the user is able to find the useful IPs for his product design within a short period under limited technical support, and the precision of the IPs adapted for the product design can be improved through machine learning.

In some embodiments, product data including information of marketing or other information related to the product of each IP may be further used to train the ML model, so as to learn the relationships among the IP portfolios, the usage data, and the product data and enhance the performance of the trained ML model. An embodiment is provided hereinafter to elaborate steps of the method in detail.

Figure 6:
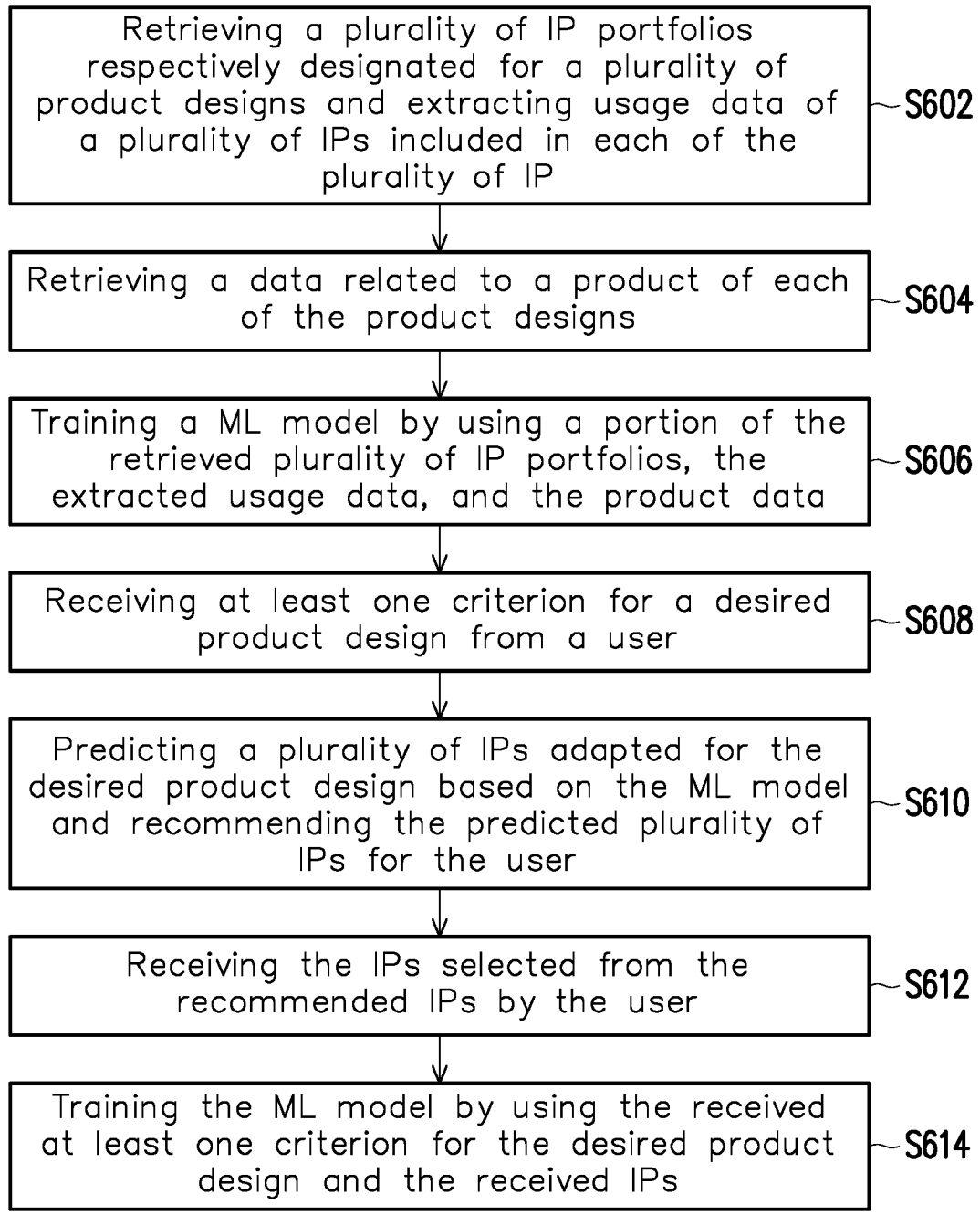
FIG. 6 illustrates a flowchart of an IP recommending method according to an exemplary embodiment of the disclosure.

FIG. 6 illustrates a flowchart of an IP recommending method according to an exemplary embodiment of the disclosure. With reference to FIG. 2 and FIG. 6 together, the method of this embodiment is adapted for the IP recommending system 10 of FIG. 2, and steps of the method are described in detail with reference to devices of the IP recommending system 10.

In step S602, the processor 20 retrieves a plurality of IP portfolios respectively designated for a plurality of product designs by using the data retrieving device 12, extracts usage data of a plurality of IPs included in each of the plurality of IP portfolios. The step S602 is the same as or similar to the step S302 in the previous embodiment, thus the details are omitted herein.

In step S604, the processor 20 retrieves a product data related to a product of each of the product designs. In some embodiments, the product data comprises marketing information.

In step S606, the processor 20 trains a ML model by using a portion of the retrieved plurality of IP portfolios, the extracted usage data and the product data. In some embodiments, the processor 20 may store the parameters of the trained ML model in the storage device 14. In some embodiments, the processor 20 may evaluates a performance of the trained ML model by using a remaining portion of the retrieved plurality of IP portfolios, the extracted usage data, and the product data.

In step S608, the processor 20 receives at least one criterion for a desired product design from the user by using the input device 16, and then in step S610, the processor 20 predicts a plurality of IPs adapted for the desired product design based on the ML model and recommends the predicted plurality of IPs for the user by displaying the predicted plurality of IPs on the display 18. The steps S608 and S610 are the same as or similar to the steps S306 and S308 in the previous embodiment, thus the details are omitted herein.

It is noted, in the present embodiment, after the processor 20 displays the predicted plurality of IPs on the display 18, in step S612, the processor 20 further receives the IPs selected by the user from the recommended IPs by using the input device 16, and then in step S614, trains the ML model by using the received at least one criterion for the desired product design and the received IPs selected by the user.

In some embodiments, the processor 20 may display each of the predicted IPs with a link to its related document (e.g. a patent publication document) such that the user may easily check the details of the IP by simply click/tap on the link and select appropriate IPs to be added to the IP portfolio adapted for the desired product design. Once the IP portfolio adapted for the desired product design is confirmed by the user, the criterion input by the user for the product design and the IPs selected by the user for the IP portfolio are used as the training data to train the ML model so as to be adapted to the desired product design and enhance the performance and diversity of the ML model.

Based on the above, the predicted and sorted IP list displayed by the IP recommending system of the disclosure may provide useful and precise IPs adapted for the desired product design for the user and save considerable time for searching and reviewing compared to the conventional exhaustive method.

In accordance with some embodiments, an IP recommending method adapted for an electronic apparatus having a processor is provided, and the method includes steps of: retrieving a plurality of IP portfolios respectively designated for a plurality of product designs and extracting usage data of a plurality of IPs included in each of the plurality of IP portfolios; training a ML model by using a portion of the retrieved plurality of IP portfolios and the extracted usage data; and in response to receiving at least one criterion for a desired product design from a user, predicting a plurality of IPs adapted for the desired product design based on the ML model and recommending the predicted plurality of IPs for the user.

In accordance with some embodiments, an IP recommending system is provided. The IP recommending system includes a data retrieving device, a storage device, an input device, a display and a processor. The data retrieving device is configured to connect and retrieve at least one IP database. The storage device is configured to store data retrieved by the data retrieving device. The input device is configured to receive an input of a user. The processor is coupled to the data retrieving device, the storage device, the input device and the display, and configured to: retrieve a plurality of IP portfolios respectively designated for a plurality of product designs from the at least one IP database by using the data retrieving device and extract usage data of a plurality of IPs included in each of the plurality of IP portfolios; train a machine learning (ML) model by using a portion of the retrieved plurality of IP portfolios and the extracted usage data and store a plurality of parameters of the trained ML model in the storage device; and in response to the input device receiving at least one criterion for a desired product design from the user, predict a plurality of IPs adapted for the desired product design based on the ML model and recommend the predicted plurality of IPs for the user by displaying the predicted plurality of IPs on the display.

In accordance with some embodiments, a non-transitory computer readable medium is provided. The non-transitory computer readable medium stores programs to be loaded into an electronic device having a processor, to perform steps of: retrieving a plurality of IP portfolios respectively designated for a plurality of product designs and extracting usage data of a plurality of IPs included in each of the plurality of IP portfolios; training a machine learning (ML) model by using a portion of the retrieved plurality of IP portfolios and the extracted usage data; and in response to receiving at least one criterion for a desired product design from a user, predicting a plurality of IPs adapted for the desired product design based on the ML model and recommending the predicted plurality of IPs for the user.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An intellectual property (IP) recommending method for an electronic apparatus having a processor, the method comprising:
    retrieving, by the processor, a plurality of IP portfolios respectively designated for a plurality of product designs comprising a tap-out in the semiconductor industry and product data related to a product of each of the product designs;
    extracting, by the processor, usage data of a plurality of IPs included in each of the plurality of IP portfolios, wherein the usage data comprises information of each of the IPs in production and the product the IP is applied for, and the product data comprises one or a combination of market segment information;
    training, by the processor, a machine learning (ML) model to learn relationships among market segment of the product and usage of the IP by using a portion of the retrieved plurality of IP portfolios, the retrieved product data and the extracted usage data;
    in response to receiving at least one criterion for a desired product design from a user, predicting, by the processor, a plurality of IPs for the desired product design based on the ML model; and
    recommending, by the processor, the predicted plurality of IPs for the user by displaying the predicted plurality of IPs for selection.

2. The method of claim 1, wherein the step of retrieving the plurality of IP portfolios comprises:
    labeling each of the plurality of IPs included in each of the plurality of IP portfolios with at least one criterion, wherein the at least one criterion comprises one or a combination of a provider, a name, a type and a version of the IP, and a dimension, a process, a protocol, a performance, and a power consumption required for a product of the IP.

3. The method of claim 1, wherein the step of extracting usage data of a plurality of IPs comprises:
    labeling the usage data of each of the plurality of IPs with at least one user adopting the IP and at least one product the IP is applied for.

4. The method of claim 1, further comprising:
    displaying a user interface including at least one entry for receiving an input of the at least one criterion for the desired product design; and
    displaying the predicted plurality of IPs recommended for the user on the user interface.

5. The method of claim 1, wherein the step of displaying the predicted plurality of IPs comprises:
    displaying the predicted plurality of IPs as a list including fields of one or a combination of a name of each of the IPs, and a type of a product of each of the IPs.

6. The method of claim 1, wherein the ML model comprises one or a combination of a rule-based algorithm, a segment-based algorithm, an item-based algorithm, or a segment and item based algorithm.

7. The method of claim 1, further comprising:
    evaluating a performance of the trained ML model by using a remaining portion of the retrieved plurality of IP portfolios and the extracted usage data.

8. The method of claim 1, further comprising:
    receiving the IPs selected from the recommended IPs by the user; and
    training the ML model by using the received at least one criterion for the desired product design and the received IPs.

9. The method of claim 1, further comprising:
    sorting the predicted plurality of IPs according to a usage probability of each of the predicted plurality of IPs.

10. An intellectual property (IP) recommending system, comprising:
    a data retrieving device, configured to connect and retrieve at least one IP database;
    a storage device, configured to store data retrieved by the data retrieving device;
    an input device, configured to receive an input of a user;
    a display; and
    a processor, coupled to the data retrieving device, the storage device, the input device and the display, and configured to:
    retrieve a plurality of IP portfolios respectively designated for a plurality of product designs comprising a tap-out in the semiconductor industry and product data related to a product of each of the product designs from the at least one IP database by using the data retrieving device;
    extract usage data of a plurality of IPs included in each of the plurality of IP portfolios, wherein the usage data comprises information of each of the IPs in production and the product the IP is applied for, and the product data comprises one or a combination of market segment information;
    train a machine learning (ML) model to learn relationships among market segment of the product and usage of the IP by using a portion of the retrieved plurality of IP portfolios, the retrieved product data and the extracted usage data and store a plurality of parameters of the trained ML model in the storage device;
    in response to the input device receiving at least one criterion for a desired product design from the user, predict a plurality of IPs for the desired product design based on the ML model; and
    recommend the predicted plurality of IPs for the user by displaying the predicted plurality of IPs for selection on the display.

11. The IP recommending system of claim 10, wherein the processor further labels each of the plurality of IPs included in each of the plurality of IP portfolios with at least one criterion, wherein the at least one criterion comprises one or a combination of a provider, a name, a type and a version of the IP, and a dimension, a process, a protocol, a performance, and a power consumption required for a product of the IP.

12. The IP recommending system of claim 10, wherein the processor further labels the usage data of each of the plurality of IPs with at least one user adopting the IP and at least one product the IP is applied for.

13. The IP recommending system of claim 10, wherein the processor further displays a user interface including at least one entry on the display for receiving an input of the at least one criterion for the desired product design, and displays the predicted plurality of IPs recommended for the user on the user interface on the display.

14. The IP recommending system of claim 10, wherein the processor further displays the predicted plurality of IPs as a list including fields of one or a combination of a name and a provider of each of the IPs, and a type of a product of each of the IPs.

15. The IP recommending system of claim 10, wherein the ML model comprises a rule-based algorithm, a segment-based algorithm, an item-based algorithm, or a segment and item based algorithm.

16. The IP recommending system of claim 10, wherein the processor further evaluates a performance of the trained ML model by using a remaining portion of the retrieved plurality of IP portfolios and the extracted usage data.

17. The IP recommending system of claim 10, wherein the processor further receives the IPs selected from the recommended IPs by the user by the input device, and trains the ML model by using the received at least one criterion for the desired product design and the received IPs.

18. A non-transitory computer readable medium, storing programs to be loaded into an electronic device having a processor, to perform steps of:

retrieving, by the processor, a plurality of IP portfolios respectively designated for a plurality of product designs comprising a tap-out in the semiconductor industry and product data related to a product of each of the product designs;

extracting, by the processor, usage data of a plurality of IPs included in each of the plurality of IP portfolios, wherein the usage data comprises information of each of the IPs in production and the product the IP is applied for, and the product data comprises one or a combination of market segment information;

training, by the processor, a machine learning (ML) model to learn relationships among market segment of the product and usage of the IP by using a portion of the retrieved plurality of IP portfolios, the retrieved product data and the extracted usage data;

in response to receiving at least one criterion for a desired product design from a user, predicting, by the processor, a plurality of IPs for the desired product design based on the ML model; and recommending, by the processor, the predicted plurality of IPs for the user by displaying the predicted plurality of IPs for selection.

19. The non-transitory computer readable medium of claim 18, further comprising:

displaying a user interface including at least one entry for receiving an input of the at least one criterion for the desired product design; and displaying the predicted plurality of IPs recommended for the user on the user interface.

20. The non-transitory computer readable medium of claim 18, wherein the step of displaying the predicted plurality of IPs comprises:

displaying the predicted plurality of IPs as a list including fields of one or a combination of a name of each of the IPs, and a type of a product of each of the IPs.

\* \* \* \* \*